United States Patent

[11] 3,620,793

[72] Inventors Hartmut Gossel
Kriftel, Taunus;
Kurt Merkle, Kelkheim, Taunus;
Ferdinand Memmel, Frankfurt am Main;
Erwin Janousch, Camberg, Taunus, all of Germany
[21] Appl. No. 756,388
[22] Filed Aug. 30, 1968
[45] Patented Nov. 16, 1971
[73] Assignee Farbwerke Hoechst Aktiengesellschaft vormals Meister Lucius & Bruning Frankfurt am Main, Germany
[32] Priority Sept. 4, 1967
[33] Germany
[31] P 16 69 157.9

[54] PIGMENT PREPARATIONS TO BE USED IN NONAQUEOUS SYSTEMS
4 Claims, No Drawings
[52] U.S. Cl. ................................................. 106/308 Q, 260/33.4 P, 260/37 NP, 260/41 C
[51] Int. Cl. ...................................................... C09c 3/02
[50] Field of Search ......................................... 106/308 O, 309, 288 O, 308 Q, 288 Q, 309

[56] References Cited
UNITED STATES PATENTS

| | | | |
|---|---|---|---|
| 2,902,385 | 7/1959 | Raab et al. | 106/308 O |
| 2,907,670 | 10/1959 | Katz et al. | 106/308 O |
| 2,942,997 | 6/1960 | Bram et al. | 106/308 |
| 3,205,085 | 9/1965 | Bailin | 106/300 |
| 3,211,569 | 10/1965 | Patton | 106/308 O |
| 3,236,797 | 2/1966 | Williams | 106/308 O X |

Primary Examiner—Tobias E. Levow
Assistant Examiner—H. M. S. Sneed
Attorney—Curtis, Morris & Safford ABSTRACT: Pigment dispersions consisting of a finely distributed pigment dyestuff in a dispersing medium suitable for being used in nonaqueous systems, wherein the dispersing medium consists of compounds of the general formula

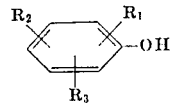

wherein $R_1$ represents an alkyl radical with four to 18 carbon atoms, and $R_2$ and $R_3$ are hydrogen atoms or alkyl groups containing from one to 18 carbon atoms, the alkyl groups being straight-chained or branched, or a mixture thereof, and a process for their manufacture.

PIGMENT PREPARATIONS TO BE USED IN NONAQUEOUS SYSTEMS

The pigmentation of nonaqueous systems, such, for instance, as lacquers, plastics and cellular plastics is generally carried out by triturating in a three roller mill the dry pigment powder with a part or a component of the medium to be dyed, and by subsequently distributing in the application medium the pigment paste formed. By treatment in a three roller mill the agglomerates formed by force in the pigment powders during the production and the drying of the dyestuffs are destroyed to a large extent. By this measure a considerable increase in tinctorial strength is attained when the pigments are applied. The dispersing medium serves to facilitate the destruction of the pigment agglomerates and to stabilize the high fine-distribution of the pigment, i.e. to inhibit a reagglomeration of the pigment particles in the preparations.

Pastes obtained under the above-mentioned conditions still show, however, essential disadvantages which badly influence their use in industrial practice. For instance, the dispersing medium used in these cases is not broadly compatible with other mediums applied, i.e. the possibility of pigmenting with said pastes systems based on a heterogeneous substance, is very small. Moreover, the are are often not storable for a sufficiently long period, since the dispersing medium used favors the dissolution of the pigment, thus causing losses in tinctorial strength. This particularly applies to the softeners used in many cases for the pigmentation of plastics, i.e. dibutyl-phthalate and dioctylphthalate. Finally, the pigment mostly develops its full tinctorial strength in the dispersing medium applied only with application of high shearing stress.

Therefore, a high interest existed to obtain a pigment preparation containing a dispersing medium not exhibiting the drawbacks described. It is, for instance, already known that reaction products of alkylphenols, long-chain fatty alcohols or fatty acids with ethylene-oxide due to the presence of the polar polyglycolether chain show favorable dispersing properties and that when these compounds are used as dispersing medium, pigment preparations can be obtained which are suitable for the pigmentation of several nonaqueous systems (British Pat. Specification 841,519).

Now we have surprisingly found that mononuclear alkylphenols of the general formula (1) wherein $R_1$ represents an alkyl radical with 4 to 18 carbon atoms, preferably 8–12 carbon atoms, and $R_2$ and $R_3$ are hydrogen atoms or alkyl groups of from 8 to 12 carbon atoms, and wherein the alkyl groups may be straight-chained or branched, are not only excellent dispersing agents for pigments but that they also show considerable advantages in comparison with the ethoxylated products already proposed for this purpose. Mixtures of the alkylphenols concerned can likewise be used. For the application as dispersing medium the alkylphenols may contain slight amounts of unreacted starting products, for instance phenol, originating from the alkylation reaction for the production of these compounds. As an example for an especially suitable alkylphenol there may be named nonylphenol.

The present invention thus provides pigment preparations, preferably pigment pastes, of a finely divided pigment dyestuff in a dispersing medium, suitable to be used in nonaqueous systems, and characterized in that the dispersing medium consists of mononuclear alkylphenols of the general formula (1) or of mixtures thereof.

For the pigment preparations according to the invention there can be used the known inorganic and, above all, organic pigment dyestuffs. For example, there are mentioned: ferric hydroxides, furthermore azo-pigments, water-insoluble vat dyestuffs, phthalocyanine-, dioxazine-, quinacridone- and perylenetetracarboxylic acid dyestuffs. As azo-pigments there are to be understood azo-dyestuffs that are obtained by coupling the diazo- or tetrazo compounds of aromatic amines without water-solubilizing groups with the coupling components generally used in pigment chemistry.

The pigment preparations are produced by simply working the pigments into the dispersing medium. When operating in this way, usual apparatuses, for instance planetary mixers, mixing devices, dissolvers, ball-, pearl-, or sand mills, kneading devices and three roller mills may be used. Generally, one starts from the dry pigment powders; they are suitably mixed at first in the dispersing medium and then homogeneously distributed to the desired extent with the aid of a dispersing device. The operating temperature for the production of the preparations depends upon the pigment and the carrier substance used. It generally amounts to room temperature; in special cases elevated temperatures may be applied which should, however, not exceed 100° C.

In the pigment preparations according to the invention the ratio between dispersing medium and pigment may vary within wide limits. This ratio depends, above all, upon the nature of the pigment to be prepared, the required consistency of the pastes and the intended use of the preparations. Generally, the pigment content of the preparations is maintained within a range of from about 10 to 80 percent by weight. An essential characteristic of the pigment preparations according to the invention consists in the fact that, with a view to their being used in nonaqueous mediums, they may be dosed easily and combined with each other without difficulties.

The use of alkylphenols of the general formula (1), especially of nonylphenol, or of mixtures of said alkylphenols, as dispersing medium for the pigment preparations according to the invention shows a number of essential advantages in comparison with the ethoxylated products already proposed for this purpose:

It is found, for instance, that the pigment content of the preparations manufactured in the above-mentioned way, in the flowing state in which they can easily be treated unobjectionably depending on the pigment used, is higher by a factor of up to 1.6. Thereby, the portion of substance heterogeneous to the system (dispersing medium) which is drawn during pigmentation into the medium applied is correspondingly lower.

When using alkylphenols as dispersing medium, organic pigments can likewise be introduced into the dispersing medium by flushing the aqueous pigment press cake, according to an especially advantageous and economic method of the process according to the invention.

A further advantage of the pigment preparations produced according to the process of the present invention can be seen in the fact that the latter, in addition to tee pigmentation of polyether and polyester cellular plastics, unsaturated polyester resins, PVC spreading pastes and other hydrophobic systems, can also be used for shading stoving lacquers. In this connection it is advantageously observed that the alkylphenols especially nonylphenol show the property of escaping from the lacquer layer during the stoving procedure. Thus, a diminution of hardness and weather resistance of the lacquer layers is avoided even though they contain a higher amount of paste (stronger pigmentation).

Finally, the preparations produced by means of these alkylphenols are not hygroscopic. This shows a favorable effect insofar as the presence of small amounts of water may cause disturbances as regards the compatibility of the dispersing medium when worked into non-aqueous systems.

As further favorable features, particularly when nonylphenol is used as dispersing medium, there is mentioned that a sufficient degree of dispersion is attained with many pigments with the aid of a planetary stirrer. For dispersing pigments very hard in grain on the three roller mill, a single passage of the pasty pigment in this apparatus is in most cases sufficient to attain the fine size of grain of $< 5\mu$, whereas with the known methods several passages are necessary. Furthermore, due to the low vapor pressure at room temperature all difficulties occurring with the use of easily volatile, combustible solvents for the manufacture of pigment preparations do not exist. The dissolving capacity of the dispersing medium with regard to the incorporated pigment is low.

The dispersing medium of the above-mentioned alkylphenols or mixtures thereof can be diluted, if necessary, with a softener, an inert organic solvent, a solution of a resin in such a solvent or likewise with a liquid resin. This may be desirable, for example, if the pigment preparation is to be incorporated into a system in which the presence of large proportions of the dispersing medium are inconvenient.

The following examples illustrate the invention, but they are not intended to limit it thereto. The indications in percent are percent by weight.

EXAMPLE 1

200 grams of dry powder of pigment C.I. Vat Orange 7 (COLOR Index No 71 105 ) are mixed with 540grams of industrial nonylphenol contaminated mainly by dinonylphenol (about 15 - 20percent) and the mixture is stirred for 2hours with a planetary stirrer. After addition of a further 93grams of industrial nonylphenol a flowing paste is obtained the pigment content of which amounts to 24percent.

EXAMPLE 2

210grams of dry powder of pigment C.I. Yellow 13 (Color Index No. 21 100 ) are mixed with 390grams of industrial nonylphenol and the mixture is stirred for 2hours with a planetary stirrer. After addition of a further 178grams of industrial nonylphenol a flowing paste is obtained the pigment content of which amounts to 27percent.

EXAMPLE 3

550grams of dry powder of pigment C.I. Red 101 (Color Index No. 77 491 ) are mixed with 310 grams of industrial nonylphenol and the mixture is stirred for 2hours with a planetary stirrer. After addition of a further 90grams of industrial nonylphenol a flowing paste is obtained the pigment content of which amounts to 58percent.

EXAMPLE 4

221 grams of dry powder of the pigment C.I. Violet 19 especially hard in grain (Color Index No. 46 500 ) are mixed with 448 grams of industrial nonylphenol and the mixture is stirred for 2hours with a planetary stirrer. After addition of a further 257grams of industrial nonylphenol a flowing paste is obtained the pigment content of which amounts to 23percent.

As grindometer value of such a paste (measured by means of a Hegmann grindometer), 35$\mu$ are found, which value, after a single passage on the three roller mill, decreases to below 5 $\mu$. (Size of grain required in the lacquer field.

EXAMPLE 5

150grams of dry powder of pigment C.I. Vat Orange 7 (Color Index No. 71 105 ) are mixed with 320 grams of industrial octylphenol and the mixture is stirred for 2hours with a planetary stirrer. After addition of a further 130grams of industrial octylphenol a flowing paste is obtained the pigment contents of which amount to 25percent.

EXAMPLE 6

315 grams of dry powder of pigment C.I. Vat Orange 7 (Color Index No. 71 105 ) are mixed with 1 185grams of industrial nonylphenol and the mixture is stirred for 15minutes with a dissolver. A flowing paste is obtained the pigment contents of which amount to 21percent.

EXAMPLE 7

500grams of aqueous press cake of pigment C.I. Yellow 17 (Color Index No. 21 105 ) with a pigment content of 25percent is kneaded for about 1 hour with 340grams of industrial nonylphenol. The water separating up to that time is poured off. Another 220grams of aqueous press cake and 80grams of industrial nonylphenol are added and the whole is kneaded for about a further 2 hours. The separating water is again poured off. By operating in this way, about 75percent of the water introduced due to the water content of the press cake are removed in total. Over night the paste is kneaded to dryness under reduced pressure. The pigment content of the paste amounts to 30percent.

We claim:

1. A pigment preparation consisting of a finely distributed organic pigment dyestuff in a dispersing medium suitable for being used in nonaqueous systems, which comprises as the dispersing medium a compound of the general formula

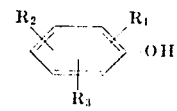

(1)

Awherein $R_1$ represents an alkyl radical with 4 to 18 carbon atoms, and $R_2$ and $R_3$ are hydrogen atoms or alkyl groups containing from 1 to 18 carbon atoms, the alkyl groups being straight-chained or branched, or a mixture thereof.

2. A pigment preparation as claimed in claim 1, wherein $R_1$ represents an alkyl radical with 8 to 12 carbon atoms, add $R_2$ and $R_3$ are hydrogen atoms or alkyl groups containing from 8 to 12 carbon atoms.

3. A pigment preparation as claimed in claim 1 which comprises as the dispersing medium industrial nonylphenol.

4. A pigment preparation as claimed in claim 1 which comprises the pigment dyestuff finely distributed in the dispersing medium in an amount within a range of from 10 to 80 percent, calculated on the total weight of the preparation.

* * * * *